(12) United States Patent
Spivak et al.

(10) Patent No.: US 8,793,314 B2
(45) Date of Patent: Jul. 29, 2014

(54) METHOD AND SYSTEM FOR CREATING EVENTS AND MATCHING USERS VIA BLENDED PROFILES

(75) Inventors: Katharine D. Spivak, San Jose, CA (US); Jon H. Winters, San Mateo, CA (US)

(73) Assignee: BlendAbout, Inc., San Jose, CA (US)

( * ) Notice: Subject to any disclaimer, the term of this patent is extended or adjusted under 35 U.S.C. 154(b) by 118 days.

(21) Appl. No.: 13/476,993

(22) Filed: May 21, 2012

(65) Prior Publication Data
US 2012/0296973 A1  Nov. 22, 2012

Related U.S. Application Data

(60) Provisional application No. 61/488,470, filed on May 20, 2011.

(51) Int. Cl.
*G06F 15/16* (2006.01)
*G06Q 10/02* (2012.01)
*G06Q 10/06* (2012.01)
*G06Q 30/02* (2012.01)

(52) U.S. Cl.
CPC ........ *G06Q 10/02* (2013.01); *G06Q 10/063112* (2013.01); *G06Q 30/0201* (2013.01)
USPC ........... 709/204; 707/737; 707/758; 709/203; 709/217; 715/751; 705/319

(58) Field of Classification Search
CPC . G06Q 10/02; G06Q 10/109; G06Q 10/1095; G06Q 10/06314; G06Q 10/063112; G06Q 50/01; G06Q 30/0269; H04L 67/22; H04L 67/306; H04L 29/08936
USPC .................. 709/204, 203, 217; 707/737, 758; 705/319; 715/751
See application file for complete search history.

(56) References Cited

U.S. PATENT DOCUMENTS 8,209,310 B1 * 6/2012 Metcalfe ........................ 707/705
2004/0107283 A1 * 6/2004 Paddon .......................... 709/229

(Continued)

FOREIGN PATENT DOCUMENTS

KR   10-2006-0031016 A   4/2006
KR   10-2007-0083983 A   8/2007

OTHER PUBLICATIONS

International Search Report of PCT application No. PCT/US2012/038835, Nov. 29, 2012, 3 pages.

(Continued)

*Primary Examiner* — Liangche A Wang
*Assistant Examiner* — Johnny Aguiar
(74) *Attorney, Agent, or Firm* — Perkins Coie LLP

(57) ABSTRACT

Certain embodiments teach a method and system for pairing users, whom do not know each other for an event, on a social networking platform. The social dining system matches people with common interests and organizes an offline event, such as a meal at a restaurant, based on user profiles, availability, and other attributes. For example, the social dining system can schedule a group meal for a user, and five to seven other people that share an interest with the user. In cases where a user prefers to be attend events with at least one known user, a single profile for the user and the known user is created as a mutual or a blended profile. The system then creates an event by matching the mutual profile with other members using a blending algorithm.

13 Claims, 10 Drawing Sheets

(56) References Cited

U.S. PATENT DOCUMENTS

| | | |
|---|---|---|
| 2005/0165762 A1* | 7/2005 | Bishop .............................. 707/3 |
| 2007/0192299 A1* | 8/2007 | Zuckerberg et al. .............. 707/3 |
| 2008/0140350 A1 | 6/2008 | Stackpole |
| 2009/0055234 A1 | 2/2009 | Li et al. |
| 2009/0198666 A1* | 8/2009 | Winston et al. ................... 707/5 |
| 2009/0210494 A1* | 8/2009 | Fisher et al. ................. 709/205 |
| 2009/0307234 A1* | 12/2009 | Zrike et al. ...................... 707/10 |
| 2010/0191844 A1* | 7/2010 | He et al. ........................ 709/224 |
| 2011/0004501 A1* | 1/2011 | Pradhan et al. .................... 705/8 |
| 2011/0015961 A1* | 1/2011 | Chan ................................. 705/9 |
| 2012/0059707 A1* | 3/2012 | Goenka et al. ............. 705/14.41 |

OTHER PUBLICATIONS

Written Opinion of PCT application no. PCT/US2012/038835, Nov. 29, 2012, 4 pages.

* cited by examiner

METHOD AND SYSTEM FOR CREATING EVENTS AND MATCHING USERS VIA BLENDED PROFILES

CROSS REFERENCES

This patent application claims the benefit of U.S. Provisional Application No. 61/488,470, entitled "METHOD AND SYSTEM FOR CREATING EVENTS AND MATCHING USERS VIA BLENDED PROFILES," filed May 20, 2011, and is hereby incorporated by reference.

BACKGROUND

People routinely rely on social networking and social media websites on the Internet to renew former ties, maintain current relationships, or to create new connections. Current websites facilitate online interactions between users having a common activity, interest, profession, cause, etc. These systems allow a user to unilaterally communicate with his/her social network by posting status updates or broadcasting information. Present-day social networking platforms additionally offer users the ability to join or create an interest or activity group within the website. There are also online dating services which essentially pair one user with another user.

While the most pervasive way for individuals to connect online is through these social networking and dating websites, this method has several shortcomings and inefficiencies. For example, current networking platforms primarily focus on interaction in the virtual world (i.e., on an online basis) and this exchange is typically amongst prior acquaintances. Some primarily operate as a bulletin board or forum in which a meeting with fellow members must be initiated by an organizing member or leader. As such, the development of a personal interaction in an offline setting relies on the enthusiasm, focus, resources, and time constraints of the individuals. In the instance of online dating websites, the service primarily fosters interaction between users on a one-to-one basis, in which the risks of rejection, deception, and even physical danger exist in some cases.

As such, in a world where people are relying on virtual interactions to connect with others, it is desirable to implement a system that increases human (i.e., offline) connections, and provides an opportunity for real people to meet in the real world. A system is needed that harnesses the utility of the Internet to arrange an event that matches a user, and at least one other individual known to the user, with other people in a social setting.

BRIEF DESCRIPTION OF THE DRAWINGS

Examples of a system and method for creating events and matching users via mutual profiles are illustrated in the figures. The examples and figures are illustrative rather than limiting.

DETAILED DESCRIPTION

Figure 1:
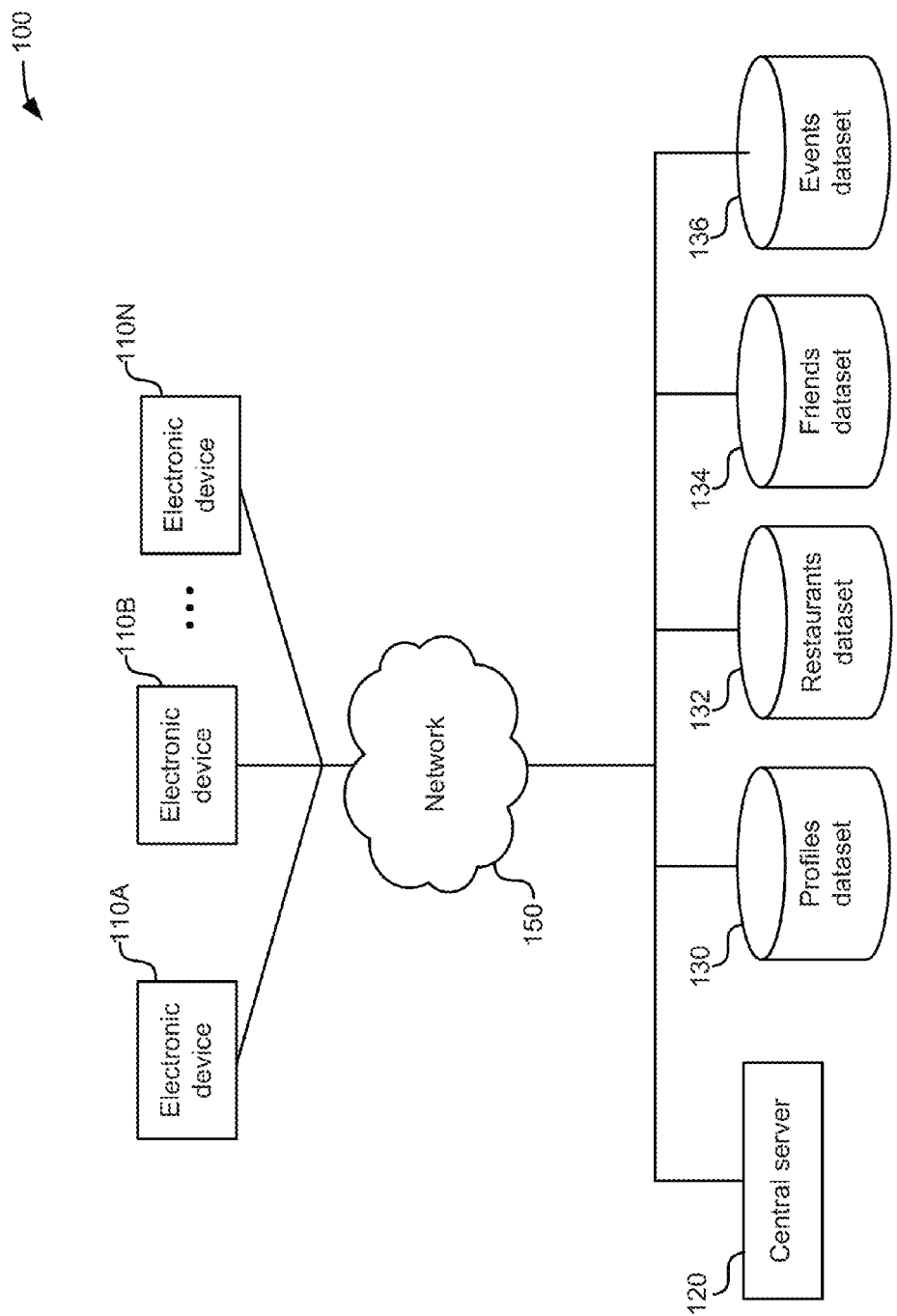
FIG. 1 depicts an example environment in which the method and system for matching users and creating events via a mutual profile (also known as a "blended profile") can be implemented, according to one embodiment.

The following description and drawings are illustrative and are not to be construed as limiting. Numerous specific details are described to provide a thorough understanding of the disclosure. However, in certain instances, well-known or conventional details are not described in order to avoid obscuring the description.

Without intent to further limit the scope of the disclosure, examples of instruments, apparatus, methods and their related results according to the embodiments of the present disclosure are given below. Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

Certain embodiments teach a method and system for pairing users, whom do not know each other for an event, on a social networking platform. The social dining system matches people with common interests and organizes an offline event, such as a meal at a restaurant, based on user profiles, availability, and other attributes. For example, the social dining system can schedule a group meal for a user, and five to seven other people that share an interest with the user. In cases where a user prefers to be attend events with at least one known user, a single profile for the user and the known user is created as a mutual or a blended profile. The system then creates an event by matching the mutual profile with other members using a blending algorithm (discussed in detail further herein).

By matching online users for an event that takes place outside the virtual world, the method and system facilitates offline interaction in the real world. Small intimate groups allow a user to connect with and make new friends, meet potential business partners, and potentially find a significant other. Moreover, the social dining system facilitates the ability of individuals traveling for business or leisure to meet new people in a destination city.

The social dining system enables users to create a plurality of profiles such as a personal profile, a professional profile, a food profile, a mutual profile, and so on. Based on the indicated interests (or "attributes") in these profiles, events can be created based, at least in part, on a commonality or similarity between users. With a mutual profile, the system permits a user to invite an existing friend to join in on the social dining adventure and thus, attend an event without having to go it alone, The mutual profile's advantage is derived from the general observation that most people prefer meeting new people in a group setting. First, meeting people with at least one other person reduces the risks of rejection, deception, and incompatibility. Also, jointly interacting with unfamiliar people is more comfortable and increases the ease of determining common interests among the group. Further, social norms all but ensure that a user will not engage in deception when there is a familiar party involved who can confirm or discredit any assertions by the user. The system enables an individual to leverage his or her social network of friends and acquaintances to meet new people in a group setting.

In one embodiment of a mutual profile, the system facilitates the ability of a user to attend events with an acquaintance, friend, relative, colleague, or significant other. The system allows at least two individuals (also known as "multiples") in a network to connect with other multiples based on a common interest in the mutual profile. The matching of multiples based on a common interest in a particular subject is more likely to lead to more interesting conversations and lasting engagements. The system also provides visibility to businesses such as restaurants, artisan food suppliers, winemakers, etc. whereby users in the system can easily make referrals. As used herein, the term "restaurants" broadly refers to any entity that has goods and/or services to offer and desires to display a listing to users on their electronic devices 110A-N. Restaurant is intended to refer to any entity that can provide an offline activity, product, and/or service to a user and does not merely refer to an entity that offers food products and services.

FIG. 1 depicts an example block diagram 100 of a system including a plurality of electronic devices 110A-N, an online payment processing service 170, a central server 120, and a profiles dataset 130, a restaurant dataset 132, a friends dataset 134, and an events dataset 136 coupled via a network 150, according to one embodiment.

The plurality of electronic devices 110A-N can be any system and/or device, and/or any combination of devices/systems, for presenting information to a user and potentially establishing a connection via the network to the central server 120. Examples of electronic devices 110A-N include, but are not limited to, personal computers, laptop computers, computer dusters, mobile telephones, mobile notebooks/tablets, personal digital assistants, and the like. The electronic devices 110A-N may be coupled to the network 150 via a wired or wireless connection or by any other method.

Users of the electronic devices 110A-N have the ability to access the social dining system by initiating, downloading, or installing software or an application. In one embodiment, the user initiates a web browser to peruse electronic content and to establish online communications. In another embodiment, the user interfaces with an executable program or a stand-alone application to access the social dining system. For example, a user may access a mobile application on his or her cell phone to access features of the system. The social dining system (once initiated, installed, downloaded, etc.), may present items to the user such as data, images, search tools, hyperlinks, community and viral features, and more. In some implementations, this access may be granted after a registration process in which the user provides a valid email address and a password. In an alternative or further implementation, this access may be granted after the user agrees to purchase a membership or service for a predetermined period such as a subscription.

The network 150 may include, but is not limited to, a telephonic network and an open network, such as the Internet. The network 150 may be any collection of distinct networks operating wholly or partially in conjunction to provide connectivity to the electronic devices and may appear as one or more networks to the serviced systems and devices. In one embodiment, communications over the network 150 may be achieved by a secure communications protocol, such as secure sockets layer (SSL), or transport layer security (TLS).

In addition, communications can be achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The datasets 130-136 may store information such as software, descriptive data, images, video, system information, and/or any other data item utilized by modules of the central server 120 for operation. The datasets 130, 132, 134, and 136 may be managed by (but not limited to) a database management system (DBMS), Oracle DB2, Microsoft Access, Microsoft SQL Server, PostgreSQL, MySQL, FileMaker, etc.

The datasets 130, 132, 134, and 136 can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package. An example set of data to be stored, managed, or presented, in the profiles dataset 130, restaurant dataset 132, friends dataset 134, and events dataset 136 is further illustrated in FIGS. 2B-2E.

The central server 120 is, in some embodiments, able to communicate with electronic devices 110A-N via the network 150. Additionally, the central server 120 is able to directly communication with restaurants for purposes of reservations, advertising, promotions, demographic analysis, and the like. In some embodiments, the central server 120 is able to monitor the consumer's use of an electronic device to determine which restaurants are of interest to the user, thus allowing for more customization and intelligence in matching, as related to mutual profiles, events, targeted advertising, promotions and the like. The central server 120 can also store and retrieve data from the datasets 130, 132, 134, and 136.

Figure 2A:
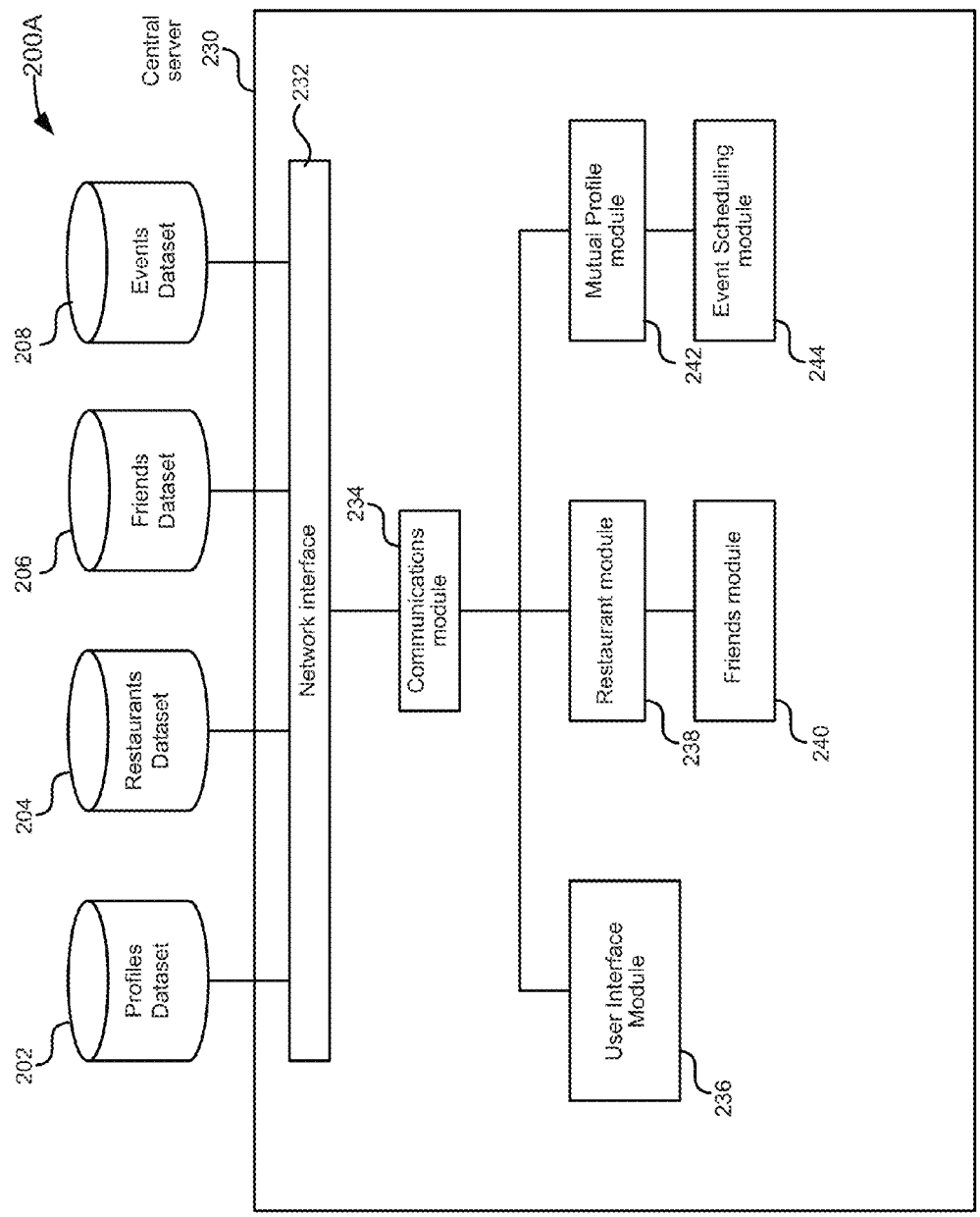
FIG. 2A depicts an example block diagram illustrating a social dining system which arranges an event by matching a mutual/blended profile with other entities (e.g., individual members, blended profiles) using a blending algorithm, according to one embodiment.

FIG. 2A depicts an example block diagram 200 illustrating a social dining system for matching users and creating events via a mutual profile. The system includes a central server 230 coupled to a profiles dataset 202, a restaurants dataset 204, a friends dataset 206, and an events dataset 208.

Referring back to FIG. 2A, the central server 230 includes a network interface 232, firewall (not shown), communications module 234, a user interface module 236, a restaurant module 242, a friends module 244, a mutual profile module, and an event scheduling module 246. Additional or fewer modules may be included. The central server 230 may be communicatively coupled to the profiles dataset 202, the restaurants dataset 204, the friends dataset 206, and the events dataset 208 as illustrated in FIG. 2A. In some embodiments, the profiles dataset 202, the restaurants dataset 204, the friends dataset 206, and the events dataset 208 are partially or wholly internal to the central server 230.

In the example of FIG. 2A, the network interface 232 can be one or more networking devices that enable the central server 230 to mediate data in a network with an entity that is external to the central server, through any known and/or convenient communications protocol supported by the central server and the external entity. The network interface 232 can include one or more of a network adaptor card, wireless network interface card, router, access point, wireless router, switch, multilayer switch, protocol converter, gateway, bridge, bridge router, hub, digital media receiver, and/or repeater.

A firewall can, in some embodiments, be included to govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand. In some embodiments, the functionalities of the network interface 232 and the firewall are partially or wholly combined and the functions of which can be implemented in any combination of software and/or hardware, in part or in whole.

In the example of FIG. 2A, the central server 230 includes the communications module 234 or a combination of communications modules communicatively coupled to the network interface 232 to manage a one-way, two-way, and/or multi-way communication sessions over a plurality of communications protocols. In one embodiment, the communications module 234 receives data (e.g., video data, textual data, video files, etc.), information, commands, requests (e.g., text-based), and/or text-based messages over a network.

Since the communications module 234 is typically compatible with receiving and/or interpreting data originating from various communication protocols, the communications module 234 is able to establish parallel and/or serial communication sessions with users of remote client devices for data and command exchange (e.g., user information and/or restaurant listings). In addition, the communications module 234 can manage log-on requests received from one or more third-parties such as users or restaurants connecting to the central server 230 to submit profile or other related information.

For example, the platform may utilize a username/email and password identification method for authorizing access. The communications module 234 can gather data to determine if the user is authorized to access the system and if so, securely logs the user into the system. In other embodiments, other forms of identity authentication, including but not limited to, security cards and digital certificates can be utilized and are contemplated, in accordance with this disclosure. A user may be able to specify and/or obtain a logon ID after subscribing or registering.

In the example of FIG. 2A, the central server 230 is coupled to a profiles dataset 202, a restaurants dataset 204, a friends dataset 206, and an events dataset 208. The central server 230 can be implemented using one or more processing units, such as server computers, UNIX workstations, personal computers, and/or other types of computes and processing devices. In the example of FIG. 2A, the central server 230 includes multiple components coupled to one another and each component is illustrated as being individual and distinct. However, in some embodiments, some or all of the components, and/or the functions represented by each of the components can be combined in any convenient and/or known manner. For example, the components of the central server may be implemented on a single computer, multiple computers, and/or in a distributed fashion.

Thus, the components of the central server 230 are functional units that may be divided over multiple computers and/or processing units. Furthermore, the functions represented by the devices can be implemented individually or in any combination thereof, in hardware, software, or a combination of hardware and software. Different and additional hardware modules and/or software agents may be included in the central server 230 without deviating from the spirit of the disclosure.

One embodiment of the central server 230 includes a user interface module 236. The user interface module 236 may be any combination of software agents and/or hardware components able to interact and communicate with one or more users 160A-M. The user interface module 236 allows users to manipulate the social dining system and allows the social dining system to indicate the effects of the users' manipulation. The user interface module 236 is, in most instances, able to present information to the user and query users' information, such as user login information, profile data, and availability, etc. and receive information in response. In a further embodiment, the user interface module 236 handles communications with members and non-members including, but not limited to, alerts, invitations, pending requests, event notices, and the like.

One embodiment of the central server 230 includes a restaurant module 238. The restaurant module 238 may be any combination of software agents and/or hardware components which manages, organizes and sorts information related to restaurants. In one embodiment, the restaurant module 238 enables users to search, browse, and generally interface with the information contained in the restaurants dataset 204 as well as indicate their preferences for restaurant(s). Users may search for a restaurant by name or search for a restaurant near/within a specific city, state, or zip code. The information displayed to a user includes restaurant name, description, whether alcohol is served, type of cuisine, location, directions, phone number, restaurant ratings (e.g., Michelin, Zagat, user), promotions, an icon or image of the restaurant, a hyperlink to the restaurant's web page or to a mechanism through which reservations can be made, and similar features. A featured restaurant may be presented to the user in an area of the user interface that is highly visible to users. In an alternative or further embodiment, the restaurant module 238 allows users to filter a pre-existing list of restaurants by certain restaurant attributes, such as distance, price (e.g., under $20, $21-30, $31-40, above $40) or cuisine. The restaurant module 238 also allows users of the social dining system to submit a rating and/or review of a particular restaurant.

In some embodiments, the restaurants module 238 includes a monitoring module (not shown) or some intelligent mechanism through which a user's selections may be tracked. One method for determining whether a user is actively interested in a particular restaurant is by tracking the user's mouse-overs, mouse clicks, interaction, and hyperlink selections. Other methods of tracking user activity may also be implemented. For example, the consumer's keywords may be monitored to determine other restaurants that a user may like. In turn, the restaurant module 238 may present additional functionalities such as a customized view of top-rated, recommended, or suggested restaurants.

In some embodiments, the restaurant module 238 includes a restaurant interface module (not shown) through which one or more restaurants can interact with the social dining system. The restaurant interface module can handle functions and features including, but not limited to, dining reservations, advertising, promotions, compensation, member conversion, and the like. For instance, a restaurant may provide promotions and coupons in coordination with the social dining platform wherein the success of the campaign (e.g., rate at which the restaurant converts an individual to a social dining user, rate at which the promotion attracts social dining users) may be assessed.

In one embodiment, the restaurant module. 238 allows a user to add restaurants that the user would like to eat at to a list of restaurants, termed a "restaurant wish list." Further, users can gauge the interest and popularity of a restaurant through an indication that shows the number of other users that have added the particular restaurant to their restaurant wish list. The restaurant module 238 allows a user to manage the restaurants in his or her restaurant wish list including rank ordering, removing, adding, modifying, rating restaurants and the like. In turn, users' assessed preference of a restaurant via e.g., rank ordering or rating can be accounted for as an attribute in the blending algorithm.

One embodiment of the central server 230 includes a friends module 240. The module 240 may be any combination of software agents and/or hardware components which manages, organizes, and sort information related to a user's association with other individuals, including individuals who are and are not members of the social dining system. In one embodiment, the friends module 240 defines certain associations or affinities between individuals such as business associate, friend, significant other, spouse, and the like and allows a user to manage his or her connection and activities with those individuals. Further, the friends module 240 allows users to import contacts and friends from an external source including social networking websites such as Facebook™. For example, the friends module 240 informs the user of current friends, recently-added friends, friend requests, restaurants recently rated by friends, and the like. Moreover, the friends module 240 enables a user to add or invite non-members to register and join the social dining system.

In the same or alternative embodiment, the friends module 240 allows a user to browse a directory of unknown (i.e., non-friend) members whom are part of the social dining system and/or whom the user would like to interact with, and to add a member to a list of target members, termed a "member wish list." To facilitate a user's perusal of fellow members, the directory of members may be organized by attribute, such as by interests (e.g., coffee and conversation), activities (e.g., basketball), location, willingness to try new foods, cuisine, restaurant wish list, any profile attribute, and the like. Further, users can gauge the appeal and popularity of a member through an indication that shows the number of other members that have added the particular user to their member wish list. In one embodiment, the friends module 240 protects the privacy of a member by displaying only select information to a user, such as the member's first name, location, and number of times the member has been wish-listed. The friend module 240 allows a user to manage the members in his or her wish list, including removing, adding, rank-ordering members and the like. In turn, the user's assessed preference for a member such as rank ordering can be accounted for as an attribute in the blending algorithm.

One embodiment of the central server includes a mutual profile module 238. The mutual profile module 238 may be any combination of software agents and/or hardware components able to create, manage, recommend, or suggest a mutual profile. A mutual profile (also called a "blended profile") is a concept that allows two or more entities to aggregate and act as a single merged entity. For example, if a user prefers to attend events with at least one individual that the user knows, a single profile comprised of the user and another member, can be created. While a blended profile is herein described as an amalgamation of a user and another known member, the blended profile is not limited to users of the social dining system, but can include other entities such as pets, kids, historical or political figures, fictional characters, celebrities, and the like. Subsequently, the system creates an event by matching the blended profile to other entities, using a blending algorithm. While the creation of a blended profile is herein described in terms of two entities, the blended profile is not limited in number, but can include two or more entities.

In some cases, a user creates a new blended profile with an individual who is currently a member of the social dining system. In one instance, the user places a query or search by entering an identifier such as name, email, avatar, and the like. In some instances, the user must first send a friendship request to the member before a blended profile can be created. After the member accepts the user's friendship request, the user can then immediately create the blended profile. In other instances, the user must send a blended profile request to the friend. In either instance, the member must accept the user's request to be a part of the blended profile. As a registered user of the social dining system, the member may have one or more associated profiles (e.g., personal, lifestyle, professional, foodie, etc.) in the system. As such, a brief description, or snapshot of the blended profile can be created which highlights significant attributes of the individual members that make-up the blended profile.

In some cases, a user creates a blended profile with another individual that is currently not a user of the social dining system. A communication such as an email or a text message may be sent to the individual, stating that the user has invited the individual to connect via the social dining system. In some embodiments, a temporary account such as a guest user login, a trial account, or the like can be used by the individual to connect with the user, whereby the individual is not required to register with the social dining system. In other embodiments, the individual must register with social dining service in order to connect with the user. After the individual registers with the social dining system, the individual becomes a member of the social dining system. With both the user and the member being registered users of the social dining system, either individual may resume the steps to create a blended profile. As described above, there may be an additional requirement in which the members must be friends in order to create the blended profile. After a blended profile consisting of the user and the member is created, the social dining system uses a blending algorithm to assist in arranging an event in which members of the blended profile interact with other social dining members.

In some cases, the mutual profile module 238 prompts the user to create a blended profile with another member as a suggested blended profile. The social dining system can automatically parse the member-set and suggest an individual with whom the user should create a blended profile. For example, if a user met and "clicked/hit-it-off" with an individual at a past event (e.g., "group meal") via user wish list or similar feedback mechanism, the social dining system may recommend reconnecting with that individual by creating a blended profile. In one embodiment, this individual can be a current member of the social dining system or a friend of (i.e., known to) the user. In another embodiment, the individual may be an unknown member of the social dining system or another individual, possibly not a member of the social dining system (e.g., celebrity, historical figure, etc.). In turn, the set of individuals from which the social dining system can recommend include, but is not limited to, a users existing set of friends on the social dining system or on another social networking website, the complete network of users on the social dining system, and the like.

In one embodiment, the single merged entity, or blended profile, is an abstract data structure, or object, which brings together the components of a data source with the procedures that manipulate them. For example, the object can be a default constructor with no parameters and read/write properties, wherein the read/write properties for the encapsulated data form the boundary conditions of the blending algorithm (discussed in more detail further herein). Further, the merged entity can be a row in a table, with each property representing the value of a column for that table.

In this embodiment, two or more instances of the same object type are merged to form a single representative entity. This can be accomplished by creating a vector space of all of the properties between the two or more instances. Next, measurements of the vector space distance are determined and form a new abstract structure, wherein the property values for this new structure are the mathematical distance measurements. After the two or more instances are merged into a single merged entity or blended profile, the blended profile can be treated as one for further processing and analysis, such as cluster analysis, comparison analysis, and the like.

One embodiment of the central server includes an event scheduling module 246. The event scheduling module 246 may be any combination of software agents and/or hardware components able to aggregate at least one blended profile with at least one other user for an event. In one implementation, the user indicates his or her ability to attend future events on a calendar (Le., available date(s) and time) and preferred location (e.g., address, zip code, city, country, state, region, and/or area). In some cases, if the user does not enter his availability, the user is not invited to an event. Moreover, the event scheduling module 246 can inform the user of pending, scheduled, confirmed, and past events, and other similar status updates.

In one embodiment, the blending algorithm pairs a blended profile with at least one other user of the social dining system. In a further or alternative embodiment, the blending algorithm joins a blended profile with one or more other blended profiles. The blending algorithm can take into account a number of attributes in the process of matching a blended profile with another entity [i.e., individual(s), blended profile(s)]. For example, the blending algorithm can take into account mutual availability, purpose (e.g., networking), activities, interests, lifestyle attributes, preferred dining locations, willingness to try new foods, favorite foods, and/or other attributes. Moreover, the blended profile's mutual friend wish list, restaurant wish list, and/or restaurant ratings can be taken into consideration in the pairing of a blended profile with another entity. Those skilled in the art will recognize that the blending algorithm can join a blended profile with other entities based upon additional attributes beyond the described elements above.

In one embodiment, the blending algorithm is implemented within a managed Dynamic Link Library (DLL). For the purposes of this description, the library and algorithm will be referred to collectively as the kernel. The overall design of the kernel will search a dataset of like objects for matches. As a simple example, a match occurs if the column-names of a data source entity match the column-names of the seed entity (i.e., the object to be matched). A list of all possible data elements within a data source entity is provided to the algorithm. In some cases, for each element within this list, the system assigns a numeric/ordered 10. Further, the blending algorithm creates vectors between two like objects that form a match and treat the pair of objects as if they were one target. In a further embodiment, the kernel is designed as a datasource filter, whereby dynamic queries can be created based on the blending algorithm.

In some embodiments, each property within the object can be weighted on a three-point weighting system. For example, the weighting can be applied wherein a weight of two is applied if the item or property (e.g., attribute) is required and must be present in the matched entities, a weight of one is applied if the property in the matched entities is moderately important, and a weight of zero is applied if the property is not important and/or no matching is performed on this item. For example, if a seed entity contains an element with a weight of one or two, then the element is used as a factor. If, for example, the seed entity has a weight of two for an element, this weighting forms a pre-filter on possible matched elements.

In one embodiment, the blending algorithm performs Quality-Thresholding (QT) clustering, whereby entities are grouped into high-quality dusters. The blending algorithm determines among a set of entities, which has the greatest similarity to a particular entity. In one embodiment, the algorithm maintains high-quality dusters by ensuring the diameter of large dusters does not exceed a predetermined diameter threshold such that dissimilar entities become part of the same duster. If the vector space distance, or diameter between two entities does not exceed a given user-defined diameter threshold, then the two entities can be clustered together. Next, other entities which minimize an increase in the diameter are added to the cluster. This occurs iteratively until no entity can be added to the duster without surpassing the given diameter threshold.

In one embodiment, the blending algorithm randomly identifies an entity (e.g., blended profile) from a set of entities (e.g., blended profiles). In a further embodiment, the attributes of the selected entity (e.g., blended profile) are also determined. Given the set of entities where any entity in that set can match, the blending algorithm then identifies a candidate entity with the greatest similarity to the selected entity. For example, if Entity A has a property "Foo" and Entity B also has a property "Foo", the matching algorithm can cluster these entities. If the total diameter of the blended entity combined with the candidate entity do not exceed a predetermined diameter threshold, then these two entities are clustered together to form a first candidate cluster. Next, other entities that minimize the increase in cluster diameter are iteratively added to this cluster until no entity can be added to this first cluster without surpassing the diameter threshold.

Next, the blending algorithm then identifies a second entity (e.g., blended profile) from the set of entities (e.g., blended profiles). The blending algorithm identifies a candidate entity with the greatest similarity to the second blended entity. Here, all entities in the set of blended entities are available for consideration for the second candidate cluster. Other entities that minimize the increase in cluster diameter are iteratively added to the second cluster until no entity can be added to this second cluster without surpassing the diameter threshold.

Next, the algorithm iterates through all entities in the set of entities and forms a candidate cluster relative to each entity. In turn, the number of candidate clusters formed is the same as the number of entities in the set of entities. Once a candidate cluster is formed for each entity, all candidate clusters below the user-specified minimum size are removed from consideration. As a result, the largest cluster that remains (above the user-specified minimum size) is selected and retained as a QT cluster. The entities within this QT cluster are now removed from consideration and the remaining entities, outside of the QT cluster, will be used for the next round of QT cluster formation.

In this embodiment, the process repeats until the largest remaining candidate cluster has fewer than the user-specified number of entities. The result is a set of non-overlapping QT clusters that meet a certain quality threshold for both size (with respect to number of entities) and similarity (with respect to maximum allowable diameter). Entities that do not form in any clusters will be grouped under an "unclassified" group. Lastly, a list of matched entities is returned for data source retrieval.

In some embodiments, the metric used to determine the distance between clusters include the farthest neighbor method, or a Complete Linkage analysis, which calculates distance between clusters in hierarchical cluster analysis. In a Complate Linkage analysis, the linkage function specifies the distance between two clusters as the maximal object-to-object distance $D(x_i, y_j)$, where objects $x_i$ belong to the first cluster, and object $y_j$ belong to the second cluster. In other words, the distance between two clusters is computed as the distance between the two farthest objects in the two clusters. Mathematically, the linkage function, or the distance between clusters X and Y is described by the following expression: $D(X,Y)=\max d(x,y)$, where $x \in X$ and $y \in Y$, and $d(x,y)$ is the distance between objects x and y and X and Y are two sets of objects (clusters).

Figure 2B:
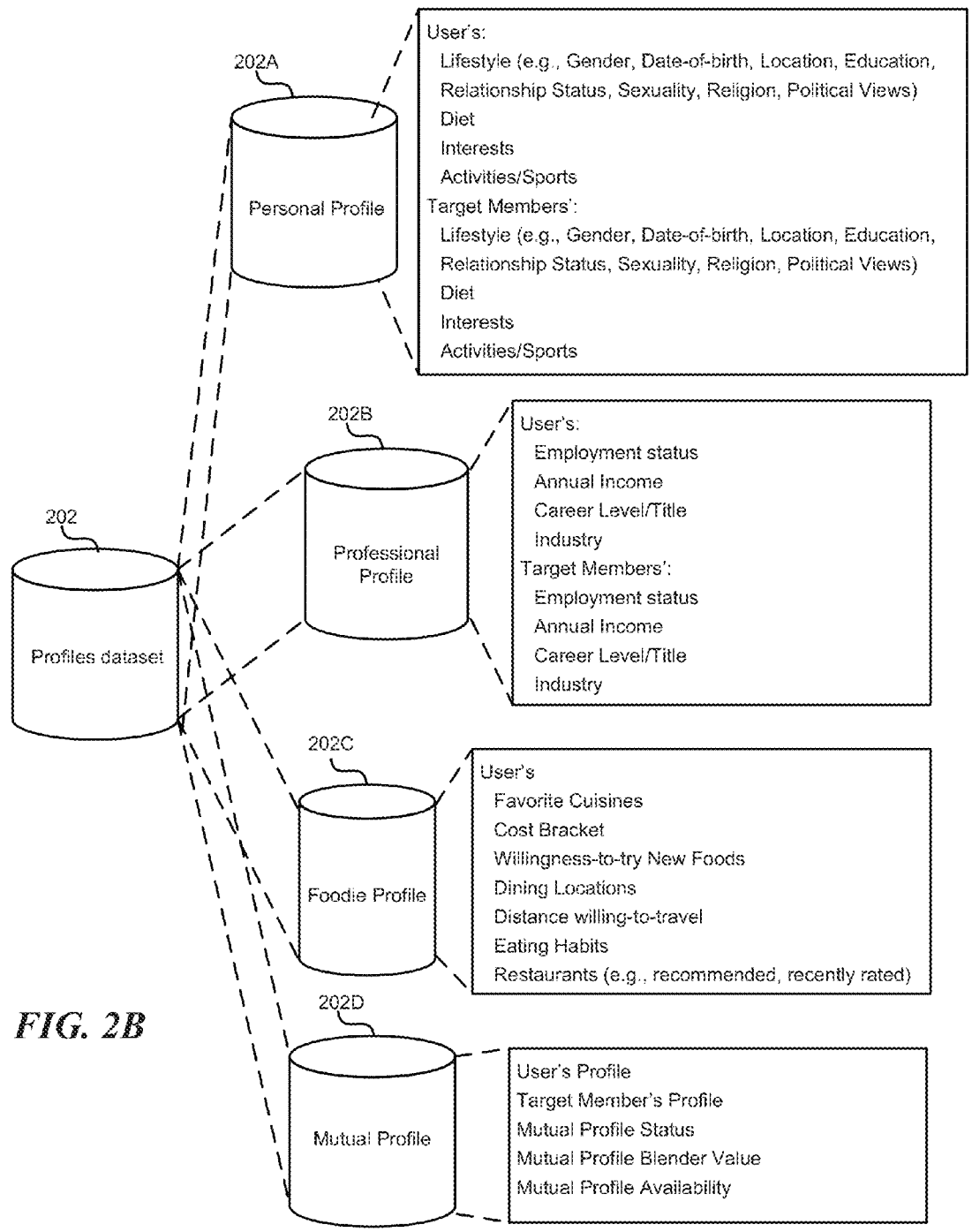
FIGS. 2B-2E depict a block diagram illustrating example datasets.
Figure 2C:
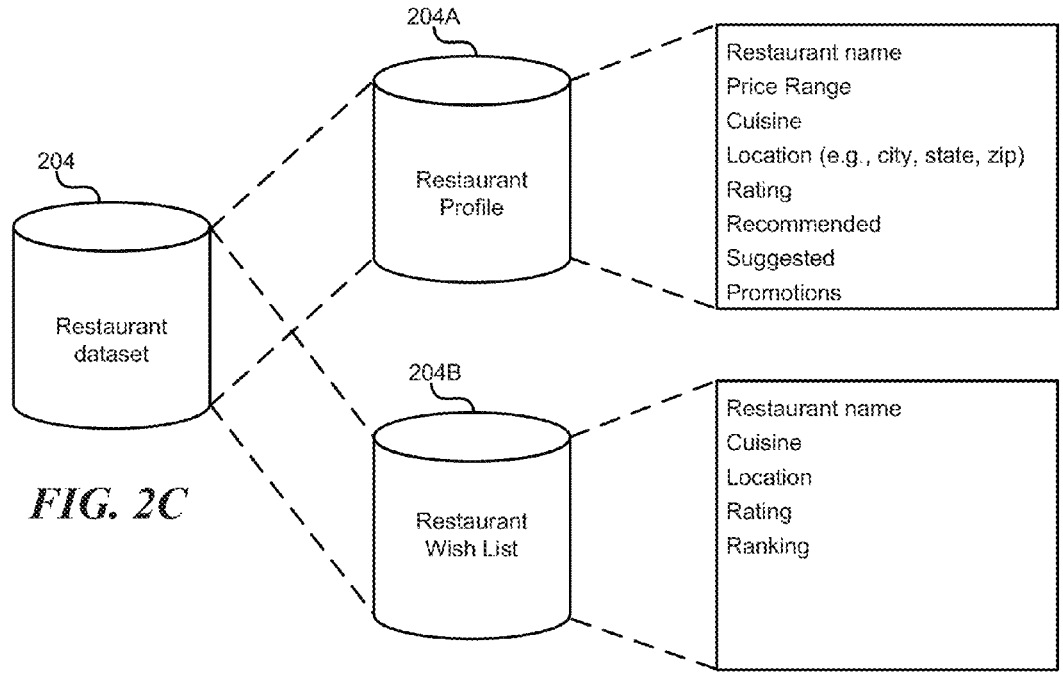
Figure 2D:
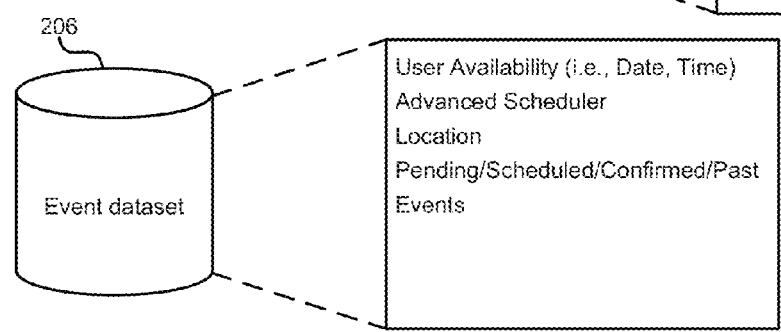

FIGS. 2B-2D depict a block diagram illustrating examples of these datasets. FIG. 2B depicts a block diagram illustrating an example profiles dataset 202 that stores personal profile data 202A, professional profile data 202B, mutual profile data 202C, and foodie profile data 202D, according to one embodiment.

In the example of FIG. 2B, personal profile data 202A is stored in dataset 202. Personal profile data includes information related to the user's personal characteristics, demographics, and preferences. Personal profile data includes, but is not limited to, information related to lifestyle such as a user's gender, date of birth, age (e.g., 18-24, 25-31, 32-38, 39-45, 46-52, 53-59, 60-66, 67+), location, education (e.g., some high school, high school grad, some college, college grad, post-graduate, I'll tell you later), relationship status (e.g., single-never married, in a relationship, married, divorced, separated, widowed, I'll tell you later), sexuality (e.g., straight, lesbian/gay, bisexual, I'll tell you later, rather not say), religion (e.g., atheist, Buddhist—Taoist, Christian, Christian—Catholic, Christian—LDS, Christian—Other, Christian—Protestant, Hindu, I'll tell you later, Islam, Jewish, None—agnostic, not religious, other, Scientology, Spiritual but not religious), political views (very conservative, conservative, middle of the road, liberal, very liberal, not political, tell you later, any). Personal profile data may also include information on the user's diet (e.g., vegan, vegetarian, low-carb, gluten-free, unrestricted), objectives (i.e., "looking to") (e.g., make new friends, network), interests (e.g., alumni connections, camping, coffee and conversation, business networking, cooking, dining out, fishing/hunting, gardening landscaping, hobbies and crafts, movies videos, museums and art, music and concerts, exploring new areas, nightclubs/dancing, performing arts, playing cards, playing sports, reading, shopping antiques, travel/sightseeing, video games, volunteering, watching sports, watching television, wine tasting), and the activities or sports (e.g., aerobics, auto racing/motocross, baseball, basketball, billiards/pool, bowling, cycling, football, golf, dancing, inline skating/roller skating, martial arts, running, skiing, soccer, swimming, tennis/racquet sports, walking/hiking, weights/machines, yoga, other types of exercise, hockey, volleyball) in which the user participates. Personal profile data also includes information related to the personal characteristics of whom a user would like to meet. In some embodiments, this individual would be another user of the social dining system and is hereinafter termed, "member." As such, personal profile data includes information related to the members sought-out by the user, termed "target members" and can include information related to the lifestyle, diet, interests, and activities/sports in which the target member participates.

In the example of FIG. 2B, professional profile data 202B is stored in dataset 202. Professional profile data includes information related to the user's professional characteristics, demographics, and preferences. Professional profile data includes, but is not limited to, information related to a user's employment status (e.g., full-time, part-time, homemaker, retired, self-employed, student, taking time off, work at home, I'll tell you later), annual income (e.g., less than $24,999, $25,000-$34,999, $35,000-$49,999, $50,000-$74,999, $75,000-99,999, $100,000-149,999, more than $150,000, I'll tell you later), career level/title (e.g., internship, entry level, associate, mid-senior level, director, executive, I'll tell you later), industry (e.g., advertising/marketing, artistic/musical/writer, banking/financial services/real estate, clerical/administrative, computer-related/hardware, construction/craftsman, education/academic research, entertainment/media, executive/management, food service, hospitality/travel, internet/eCommerce, legal services, manufacturing/distributions, medical/health services, politics/government military, sales/business development, technical/science/engineering, transportation), and the like. Professional profile data also includes information related to the professional characteristics of whom a user would like to meet. As such, professional profile data can include information related to the employment status, annual income, career level/title, industry, etc. of the target member. In some embodiments, the target member is a registered user of the social dining system.

In the example of FIG. 2B, foodie profile data 202C is stored in dataset 202. Foodie profile data includes information related to the user's eating habits, cuisine preferences, and related information. Foodie profile data includes, but is not limited to information related to a user's favorite cuisines [e.g., Afghan, African, All Cuisines, American (New), American (Traditional), Argentinean, Armenian, Asian, Austrian, Bakeries, Barbecue, Belgian, Brazilian, Burmese, Cajun & Creole, Californian, Caribbean, Central European, Chilean, Chinese, Coffee Shops & Diners, Colombian, Cuban, Deli, Desserts, Dim Sum, Easter European, Eclectic & International, Egyptian, English, Ethiopian, Family Fare, Fast Food, Filipino, French, German, Greek, Health Food, Hungarian, Indian, Indonesian, Irish, Italian, Jamaican, Japanese, Korean, Kosher, Latin American, Lebanese, Malaysian, Mediterranean, Mexican, Middle Eastern, Moroccan, Noodle Shop, Other, Pan-Asian & Pacific Rim, Polish & Czech, Polynesian, Portuguese, Puerto Rican, Russian, Scandinavian, Seafood, South American, Southern & Soul, Southwestern, Spanish, Steakhouse, Tapas/Small Plates, Thai, Tibetan, Turkish, Vegan, Vegetarian, Venezuelan, Vietnamese], a user's cost bracket preferences (e.g., under $20, $21-30, $31-40, above $40), dining location preferences (e.g., city, state, and zip code), and the like. Further, information relating to the distance a user is willing to travel (e.g., 1 mile, 5 miles, 10 miles, 20 miles, 50 miles), a user's willingness to try new foods [e.g., play it safe/comfort food, explorer (as long as I can recognize it), risk-taker (escargot doesn't sound scary at all), a user's eating habits (e.g., I mostly cook at home, I eat out once to twice a week, I eat three to four times a week, I eat out almost every night).

In the example of FIG. 2B, mutual profile data 202D is stored in dataset 202. Mutual profile data includes, but is not limited to, information related to a user's profile, a target member's profile, as well as a mutual profile's status, blender value, and availability. In the example of FIG. 2C, restaurant profile data 204A and restaurant wish list data 204B is stored in dataset 204. Restaurant profile data includes information related to a restaurant. Restaurant profile data includes, but is not limited to, restaurant name, price range, cuisine, location (e.g., city, state, zip), rating, recommended and suggested restaurants, and promotions. Restaurant wish list data includes information related to restaurant(s) in which a user is interested in dining. Wish list data includes, but is not limited to, restaurant name, cuisine, location, rating, ranking and the like.

In the example of FIG. 2D, event data 206 is stored in dataset 206. Event data includes information related to events created for users of the social dining system. Event data includes, but is not limited to, information associated with a user's availability, advanced scheduler, location, upcoming and past events.

Figure 2E:
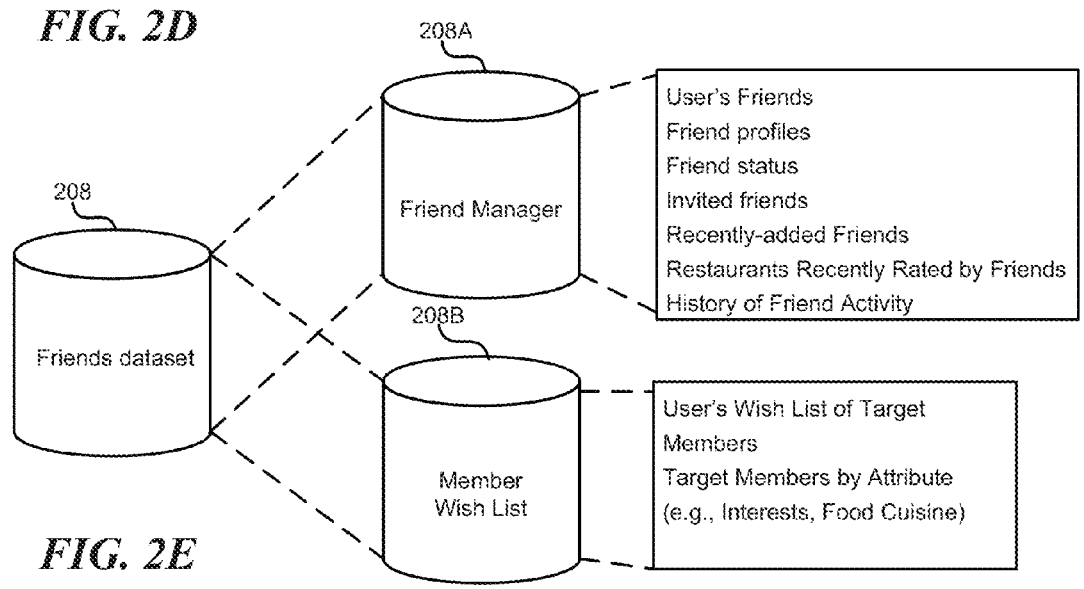

In the example of FIG. 2E, friend manager data 208A and member wish list data 208B are stored in dataset 208. Friend manager data includes information related to the management of a user's friends and other individuals that potentially may be friends. Friend manager data includes, but is not limited to, information associated with a user's friends, friends' profiles, friend status, invited friends, recently-added friends, restaurants recently-rated by friends, history of friend activity and the like. Member wish list data includes information related to the members of the social dining system whom are not friends of the user. Member wish list data includes, but is not limited to, user's wish list of target members and target member data organized by attribute.

Figure 3:
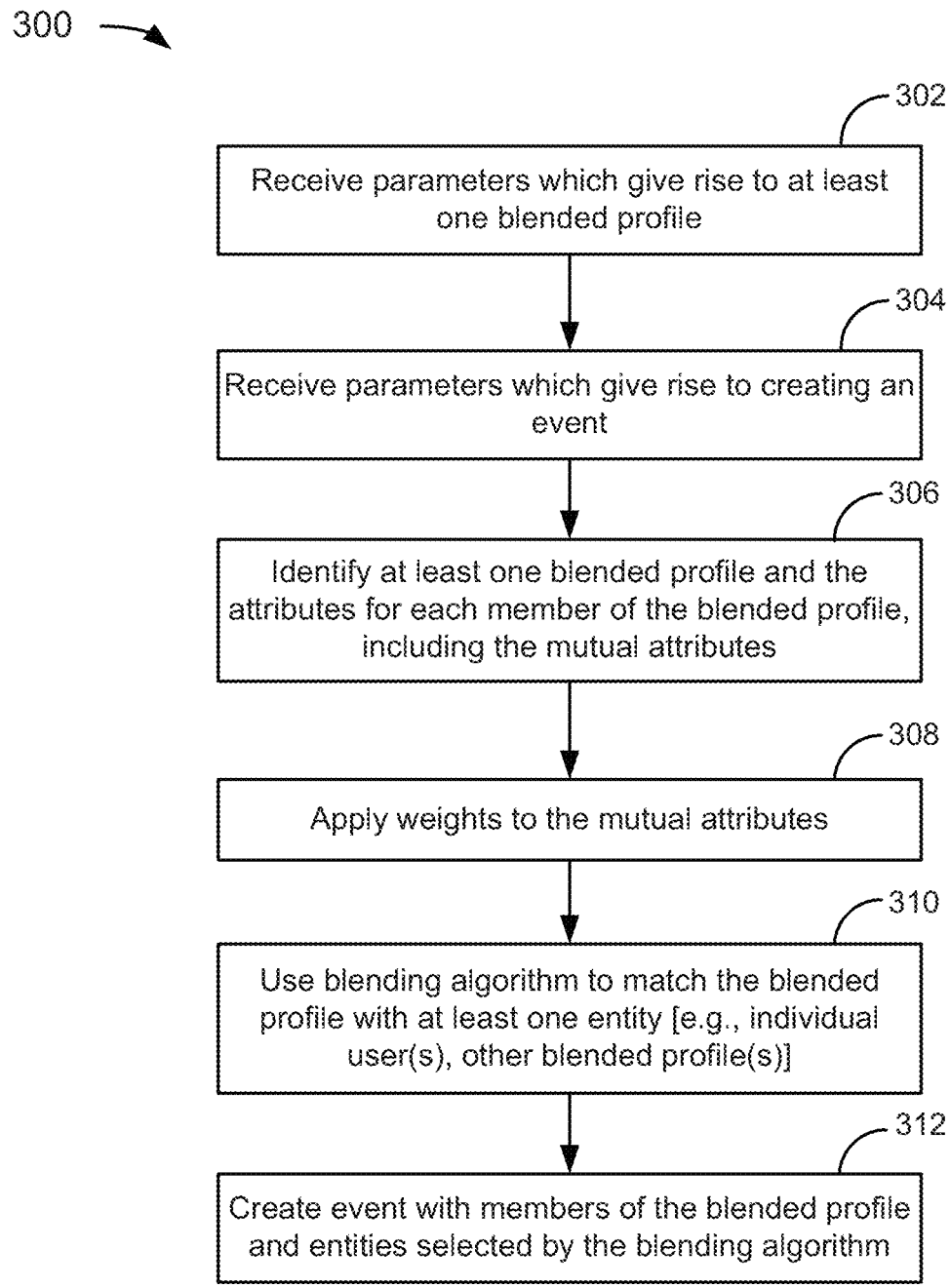
FIG. 3 depicts a flow diagram illustrating an example process of arranging an event by matching a mutual/blended profile with other entities (e.g., individual members, blended profiles) using a blending algorithm, according to one embodiment.

FIG. 3 depicts an example 300 flow diagram illustrating an example process for arranging an event by matching a blended profile with other entities (e.g., individual members, blended profiles) using a blending algorithm, according to one embodiment.

At block 302, the system receives parameters which give rise to at least one blended profile. Through the various modules described in FIG. 2A, the system maintains at least one blended profile with which to pair other entities such as individual(s) and/or other blended profile(s) [i.e., individuals that are part of the blended profile(s)]. As an example, the system receives information through which a blended profile is created, comprising a user and the users' spouse. Both the user and the users' spouse are members of the social dining system and each have, for the most part, indicated their preferences in his or her individual profiles (e.g., lifestyle, foodie, professional). In other words, the system is not only aware of the user's personal, professional, and foodie profile, but also the personal, professional, and foodie profile of a target member with whom the user would like to interact. Similarly, the system is aware of the spouse's personal, professional, and foodie profile, and those of a target member with whom the spouse would like to interact. Moreover, the system also knows of the friends, restaurant wish list, member wish list, the availability, restaurant ratings, and more of both the user and the user's spouse. With all this information within the blended profile, the system contains a plethora of data relating to the user and spouse, and can perform various comparisons between the data.

At block 304, the system receives parameters which give rise to creating an event. Through the various modules described in FIG. 2A, the system can coordinate the information necessary to create an event by matching a blended profile with other entities using a blending algorithm. From the above example, the system not only maintains the data relating to each user of a blended profile, but also the data relating to other members who may be matched to the blended profile, To illustrate, Member A and Member B are also users of the social dining system and each deems the other a "friend" in the system as they are work colleagues. As such, Member A and B have a blended profile together. Member X and Member Y are also users of the social dining system, but each member does not know any other user. The system is privy to varying degrees of profile information for the user, the user's spouse, Member A, Member B, Member X, and Member Y. Nonetheless, each individual is associated with sufficient attributes (as previously described above), such as preferences, interests, and information such that an event can be arranged. For example, each person has indicated an interest in attending a group meal, his/her availability on the calendar, as well as a preference for a geographic location. As such, the system has sufficient information to potentially create a social dining event among the six individuals. However, whether these individuals are matched by the blending algorithm depends, at least in part, on how much commonality there is between certain attributes.

At block 306, the system identifies at least one blended profile, the attributes for each member of the blended profile, including the mutual attributes (i.e., commonality between each member in the blended profile). Through the various modules described in FIG. 2A, the system selects a blended profile with which to create an event and apply the blending algorithm. From the above example, the system may select to create an event using the user/spouse blended profile and/or the Member X/Y blended profile. Further, the system ascertains the individual attributes associated with each member of the blended profile, and the mutual attributes, that is the attributes that are same or substantially the same value for each of the members of the blended profile. As an example of a mutual attribute, the user/spouse blended profile likely has mutual attributes in terms of geographic preferences and restaurant ratings, and the Member A/B blended profile likely has similar mutual attributes in terms of industry as the members are work colleagues. Other mutual attributes can include willingness to try new foods, willingness to travel a certain distance, similar target member attributes, etc.

At block 308, the system applies weights to the mutual attributes. As previously described, a weighting can be applied to each attribute based on the importance of the attribute. The blending algorithm can factor into consideration these weights as an intelligent mechanism through which a blended profile is matched. Take as an example the instance that blended profile A and B have identical attributes on all accounts except that a mutual attribute of blended profile A is a "willingness to travel only ten miles to attend an event" and a mutual attribute of blended profile B is a "willingness to travel up to 100 miles." Rather than designating the match as a near perfect match, weighting the "willingness to travel" mutual attribute as more important would allow the system to more intelligently assess the match. This step may be designed such that the same weight is applied to each attribute and no attribute is weighed more heavily.

At block 310, the system uses the blending algorithm to match the blended profile with at least one entity [e.g., individual user(s), other blended profile(s)]. Implementing the techniques previously described, the system can apply the blending algorithm to pair the blended profile with one or more individuals. In one embodiment, the blending algorithm determines how to create a social dining event (or group meal) for six people. For example, the system may apply the blending algorithm such that three, two-person blended profiles are matched. In another case, the system may apply the blending algorithm such that two blended profiles are matched with two individual members or that the blended profile is matched with four individual members. In turn, a blended profile may include two or more individuals, and a group meal event may be created for three or more individuals. As such, those skilled in the art will appreciate the various permutations of individual user(s) and blended profile(s) in formulating a social dining event.

At block 312, the system creates an event with members of the blended profile and entities selected by the blending algorithm. Through the various modules described in FIG. 2A, the system performs the necessary functions to arrange, schedule, and/or notify the members that were matched by the blending algorithm of the possibility of an event. In one embodiment, an event request and/or confirmation is sent to each member and the member has a choice to opt-in or to decline the invitation. In some cases, all of the matched members are able to learn about the other people who were matched. In other cases, only select or no information is revealed to the matched user, the matched blended profile entity, and/or all matched members. Fortunately, the user will know at least one other person at the group event who is part of the user's blended profile.

FIGS. 4A-4E depict example screenshots 500A-500E displayed on an electronic device, according to one embodiment. It will be appreciated by a person skilled hi the art that the screenshot may incorporate different content and functionalities in a format different from that shown.

Figure 4A:
FIGS. 4A-4E depict example screenshots displayed on an electronic device, according to one embodiment.
Figure 4B:
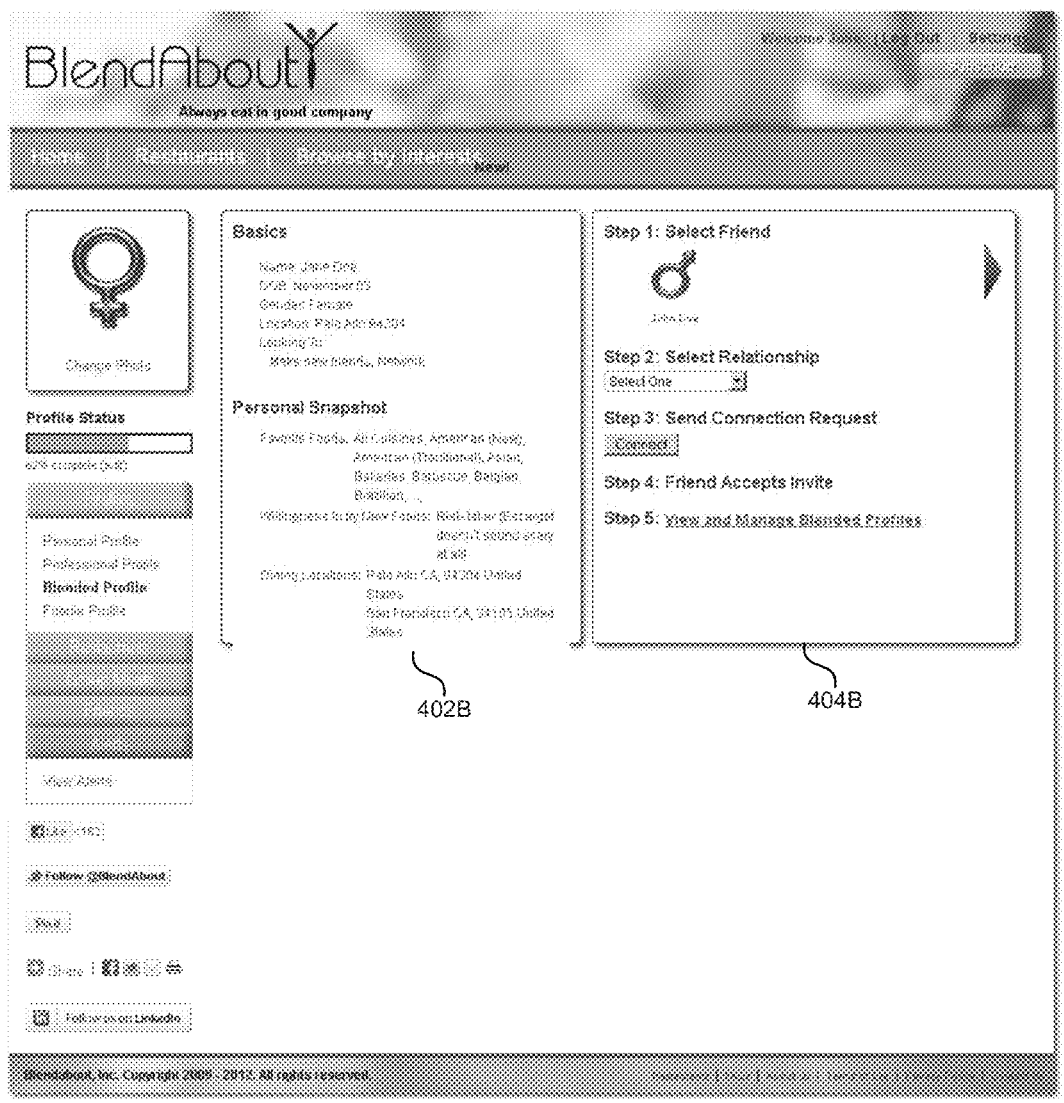

In FIG. 4A, the screenshot depicts an example user interface through which a user can manage his or her blended profiles, according to one embodiment. As shown in FIG. 4A, a navigation bar utility indicates that the user is interfacing with the blended profile modal of the profiles section 408A. Here, the user is able to manage a current, pending, or new blended profile. For example, by selecting the "Create New Blended Profile" option 402A, the user is able to initiate the process of setting-up a blended profile with another individual. By selecting the "Pending Request" option 404A, the user is able accept or decline a potential blended profile arrangement. By selecting an option without text 406A (e.g., with photos of the current members of the blended profile), the user is able to view the details of the profile and even remove it. Those skilled in the art will appreciate the addition of other functions when managing a user's blended profiles, In FIG. 4B, the screenshot depicts an example user interface through which a user can create a blended profile, according to one embodiment. After a user has selected the option to "Create New Blended Profile" 402A, a user is presented with a brief summary of his or her attributes on the left side 402B and an example set of instructions 404B through which a user can add a friend to the blended profile. In this embodiment, the user currently has one friend name John Doe with whom the user can create a blended profile. Those skilled in the art will appreciate that additional friends may be shown and that the individual being added to the blended profile does not have to currently maintain a "friend status." For example, a user may enter an email address of an individual who is currently not a member of the social dining system and solicit the creation of a blended profile with this individual. Next, the user indicates how he or she is associated with the chosen friend by selecting a relationship (e.g., business associate, friend, significant other, or spouse). A connection request is sent to the chosen friend by email, text message, alert, or the like. Here, the connection request must be accepted by the chosen friend, upon which the user can manage the blended profile on the main blended profile page 400A.

Figure 4C:
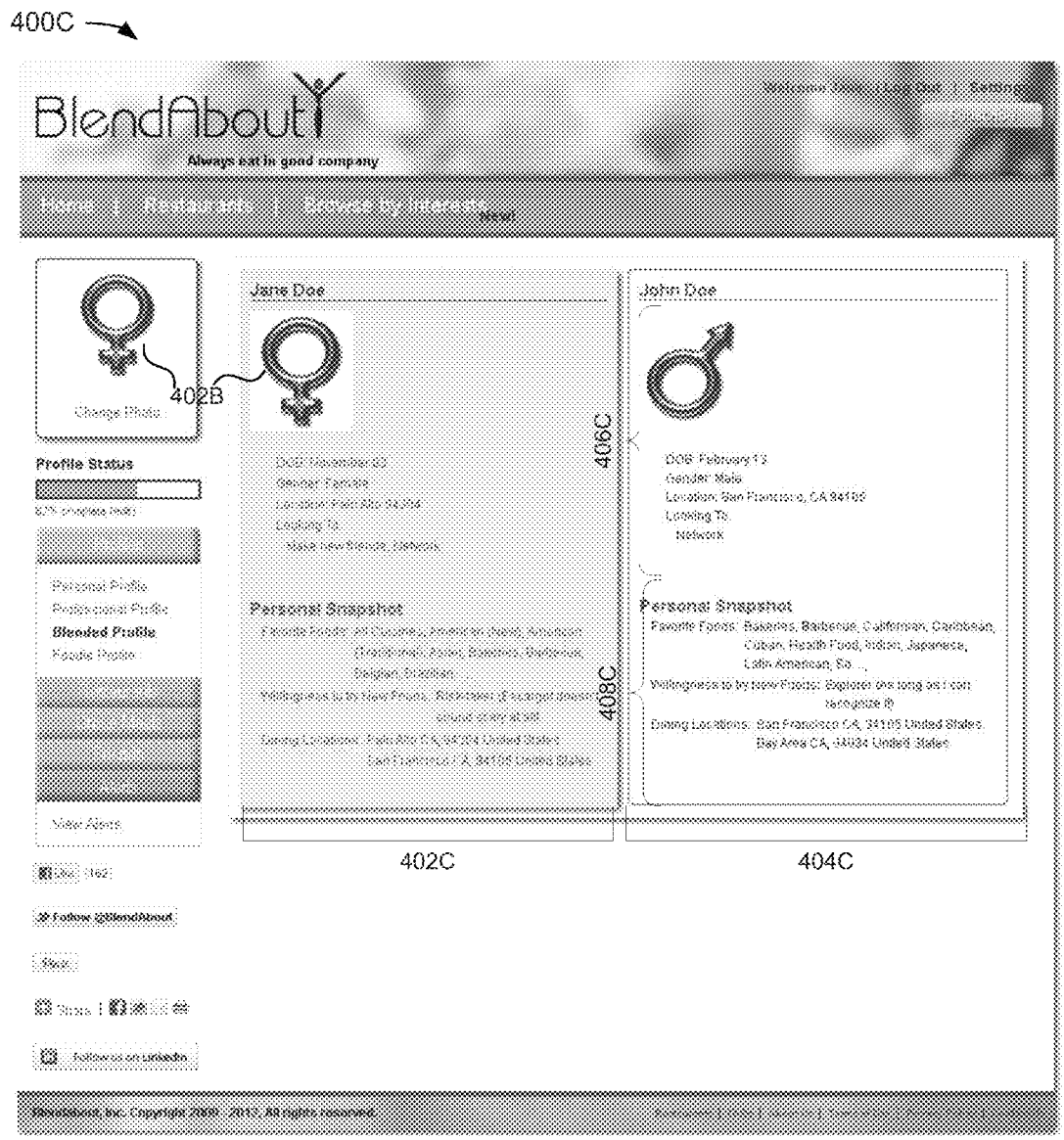

In FIG. 4C, the screenshot depicts an example user interface through which the attributes of a blended profile can be displayed, according to one embodiment. After a connection request is accepted by the friend, a user can view the details of a blended profile. As shown in FIG. 4C, the user, Jane Doe, 402B is presented with the details of her blended profile with another member, John Doe in a side-by-side summary. On the left-hand side, a photo of Jane Doe and selection of her basic attributes, such as date of birth, gender, current location, purpose, is highlighted in a one-page summary 402C. On the right-hand side, similar attributes for John Doe are presented in a one-page summary 404C for ease of comparison. John Doe's photo and basic attributes are shown in the top-half 406C and an excerpt of some of John's other attributes are shown in the bottom-half as a "personal snapshot" 408C, such as favorite food attribute, willingness to try new foods attribute, and preferred dining locations attribute.

Figure 4D:

In FIG. 4D, the screenshot depicts an example user interface through which a user can manage his or her events, according to one embodiment. As shown in FIG, 4D, a "Group Meals" section 402D allows a user to interface with mechanism 410D through which the user submits his or her availability for events. The user indicates a date she or he is available as well as a period of time (e.g., from 6:00 PM to 11:00 PM). Further, the user selects from an existing list of locations or enters a new location, specifying the city, country, state, and zip code. In turn, the user may utilize the social dining system in an instance when he or she is planning to travel to a new location in the future. Once the user submits his or her availability, the Events/Availability Calendar 408D displays the user's availability in a calendar format with certain color codes which indicate the status of a user and/or an event on a certain date. As shown in FIG. 4D, a different color indicates a user is "available," an event is "pending," "scheduled," or "confirmed," and that a "past" event had occurred.

Figure 4E:

In FIG. 4E, the screenshot depicts an example user interface through which a user can view other members of the social dining system to add to his/her user wish list, according to one embodiment. As shown in FIG. 4E, a "Browse By Interests" section 402E allows a user to browse a directory of members that share the same interest as the user and add them to a user wish list to increase the chances the user is matched with them for a group meal. A number of member photos is presented under a specific interest 404E and can be selected by the user. When a user has interacted (e.g., right-click, left-click, mouse-over) with a member photo, a brief description of the member 406E is shown, such as number of times wish-listed by other members and an option to add the member to the user's wish list. In the example of FIG. 4E, the member's information only includes a first name, and location for purposes of privacy, however, in some embodiments, additional information may be revealed. Once the user has chosen to add the member to his user wish list, an indicator 412E is shown that confirms the user's action. Further, the member is added to the collection of people in the user wish list 408E, shown in FIG. 4E as "Blender Wish List." Those skilled in the art will appreciate that the directory of members may be organized by other attributes such as lifestyle attributes, preferred dining locations, willingness to try new foods, favorite foods, purpose, restaurant wish list, and other attributes beyond those described.

The following description and drawings are illustrative and are not to be construed as limiting. Numerous specific details are described to provide a thorough understanding of the disclosure. However, in certain instances, well-known or conventional details are not described in order to avoid obscuring the description.

Without intent to further limit the scope of the disclosure, examples of instruments, apparatus, methods and their related results according to the embodiments of the present disclosure are given below. Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this patent application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed:

1. A method of scheduling a social dining event by matching a blended profile with a set of entities:
  receiving, by a social dining system, profile parameters which enable a plurality of blended profiles to be created, wherein each blended profile is an abstract data structure including information relating to at least two or more members, wherein the at least two or more members are acquainted with each other, wherein the profile parameters include attributes of each member of the at least two or more members, and wherein the attributes of each member of the at least two or more members in each blended profile are aggregated as a particular single merged entity for processing based on mutually shared attributes;

receiving, by the social dining system, event parameters which enable scheduling of a plurality of social dining events, wherein the scheduling of each social dining event includes arranging an appointment between the particular single merged entity and a particular set of entities at a restaurant, and wherein the event parameters include availability attributes of each member of the particular single merged entity and each member of the particular set of entities;

identifying, by the social dining system, a first blended profile from the plurality of blended profiles, the first blended profile being a single merged entity having a set of mutual attributes, the identifying including:
  identifying a first set of attributes for a first member of the first blended profile and a second set of attributes for a second member of the first blended profile, wherein the first member and the second member are acquainted with each other; and
  identifying a first restaurant wish list for the first member and a second restaurant wish list for the second member, the first and second restaurant wish lists each including a plurality of ranked restaurants, wherein the plurality of ranked restaurants is listed in an order based on a ranking by a respective member of the first blended profile and based on a monitoring of user activity of the respective member on the social dining system, the user activity indicative of an interest in a particular restaurant; and
  identifying a first user wish list for the first member and identifying a second user wish list for the second member, the first and second user wish lists each including a set of members that is received, by the social dining system, as an add request from the respective member browsing a directory of members of the social dining system;

determining, by the social dining system, the set of mutual attributes, the set of mutual attributes including common attributes between the first and second sets of attributes, common restaurants between the first and second restaurant wish lists, and common users between the first and second user wish lists;

applying, by the social dining system, a weight to each mutual attribute of the set of mutual attributes;

determining, by the social dining system, a first set of entities matching with the single merged entity by applying a blending algorithm, said determining, based, at least in part, on the set of mutual attributes, wherein the first set of entities is either (a) a member that is not the first or second member, or (b) a particular blended profile not including the first blended profile; and arranging, by the social dining system, a first social dining event between the single merged entity and the first set of entities matched by the blending algorithm, wherein the arranging includes communicating with a restaurant system to make reservation at the restaurant for the first social dining event.

2. The method of claim 1, wherein the common attributes between the first and second sets of attributes include any one of: a preferred geographical location, a willingness to travel, a favorite cuisine, an activity, or an interest.

3. The method of claim 1, wherein the blending algorithm utilizes a quality-thresholding clustering.

4. The method of claim 1, wherein determining, by the social dining system, the first set of entities comprises: matching the first blended profile with a second blended profile; and matching the first blended profile with a third blended profile.

5. A system for creating a social event by matching a mutual profile with a set of entities, comprising:
  a processor;
  a mutual profile module coupled to the processor to:
    receive profile parameters which enable a plurality of mutual profiles to be created, wherein each mutual profile is an abstract data structure including information relating to at least two or more members, wherein the at least two or more members are acquainted with each other, wherein the profile parameters include attributes of each member of the at least two or more members, and wherein the attributes of the at least two or more members in each mutual profile are aggregated as a particular single merged entity for processing based on mutually shared attributes; and an event scheduling module coupled to the processor to:
    receive event parameters which enable scheduling of a social event, wherein the scheduling of the social event includes arranging a meeting between the mutual profile and the set of entities at a business venue, and wherein the event parameters includes availability attributes of each member of the mutual profile and each entity of the set of entities;
    identify a first mutual profile from the plurality of mutual profiles, the first mutual profile being a single merged entity including a first member and a second member, the first and second members having a set of mutual attributes, wherein to identify further includes to:
      identify a first set of attributes for the first member of the single merged entity and a second set of attributes for the second member of the single merged entity; and
      identify a first venue wish list for the first member and a second venue wish list for the second member, the first and second venue wish lists each including a plurality of ranked venues, wherein the plurality of ranked venues is listed in an order based on a ranking by a respective member of the first and second members and based on a monitoring of user activity of the respective member using the system, the user activity indicative of an interest in a particular venue;
    determine the set of mutual attributes, the set of mutual attributes including common attributes between the first set of attributes and the second set of attributes and common venues between the first venue wish list and the second venue wish list;
    apply a weight to each mutual attribute of the set of mutual attributes;
    determine, by use of a blending algorithm, the set of entities matching with the single merged entity based, at least in part, on the set of mutual attributes, wherein the set of entities is either (a) a particular member that is not the first or second member, or (b) a particular mutual profile not including the first mutual profile; and
    arrange a first social event between the single merged entity and the set of entities matched by the blending algorithm, wherein to arrange includes to:

transmit an event invitation to each member of (a) the single merged entity and (b) the set of entities, the event invitation configured to request a confirmation from each member for attending the first social event; and responsive to the confirmation, communicate with a venue system to make reservation for a set of members at the venue, the set of members based on a number of confirmations received from the single merged entity and the set of entities.

6. The system of claim 5, wherein the common attributes between the first and second sets of attributes include any one of: a preferred geographical location, a willingness to travel, a favorite cuisine, an activity, or an interest.

7. The system of claim 5, wherein the system further comprises a friends module coupled to the processor to identify a first user wish list for the first member and to identify a second user wish list for the second member; and wherein the set of mutual attributes further includes common users between the first user wish list and the second user wish list.

8. The system of claim 5, wherein to determine, by use of the blending algorithm, includes: matching the first mutual profile with a second mutual profile and matching the first mutual profile with a third mutual profile.

9. The method of claim 5, wherein the blending algorithm utilizes a quality-thresholding clustering.

10. A method comprising:
receiving profile parameters which enable a blended profile to be created, wherein the blended profile is a single merged entity including information on a first member and a second member, wherein the first and second members are acquainted with each other, wherein the profile parameters include attributes of each member of the first and second members, and wherein the attributes of the first member are aggregated with the attributes of the second member as the single merged entity for processing based on mutually shared attributes;

receiving event parameters which enable scheduling of a social event, wherein the scheduling of the social event includes arranging a gathering between the blended profile and at least two other blended profiles at a restaurant, and wherein the event parameters include availability attributes of each member of the blended profile and each member of the at least two other blended profiles;

identifying the blended profile, wherein the identifying includes:
identifying a first set of attributes for the first member and a second set of attributes for the second member;

identifying a first restaurant wish list for the first member and a second restaurant wish list for the second member, the first and second restaurant wish lists each including a plurality of ranked restaurants, wherein the plurality of ranked restaurants is listed in an order based on a ranking by a respective member of the blended profile and based on a monitoring of user activity of the respective member on the social dining system, the user activity indicative of an interest in a particular restaurant; and identifying a first user wish list for the first member and identifying a second user wish list for the second member, the first and second user wish lists each including a set of members that is received, by the social dining system, as an add request from the respective member browsing a directory of members of the social dining system;

determining a set of mutual attributes, the set of mutual attributes including common attributes between the first and second sets of attributes, common restaurants between the first and second restaurant wish lists, and common users between the first and second user wish lists;

applying a weight to each mutual attribute of the set of mutual attributes;

determining the at least two other blended profiles matching with the blended profile by applying a blending algorithm, said determining based, at least in part, on the set of mutual attributes, wherein the at least two other blended profiles do not include the first member and do not include the second member; and arranging a first social event between the blended profile and the at least two other blended profiles matched by the blending algorithm.

11. The method of claim 10, wherein the common attributes between the first and second sets of attributes include any one of: a preferred geographical location, a willingness to travel, a favorite cuisine, an activity, or an interest.

12. The method of claim 10, wherein the blending algorithm utilizes a quality-thresholding clustering.

13. The method of claim 10, wherein determining the at least two other blended profiles matching with the blended profile by applying blending algorithm further includes: matching the first blended profile with a second blended profile and matching the first blended profile with a third blended profile.

* * * * *